April 3, 1928. 1,664,558
H. HASTINGS
LIQUID GAUGE
Filed Sept. 10, 1921 2 Sheets-Sheet 1
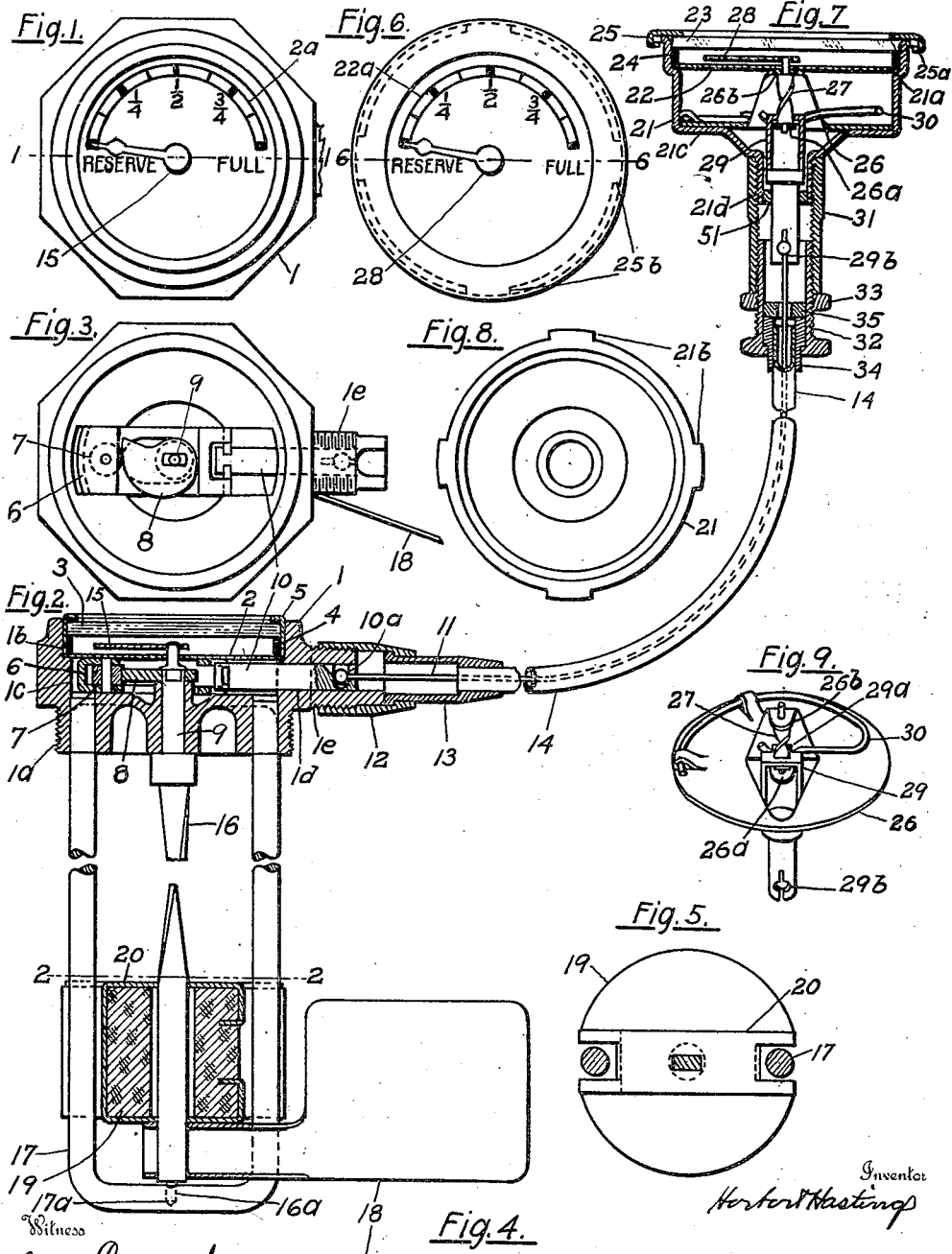

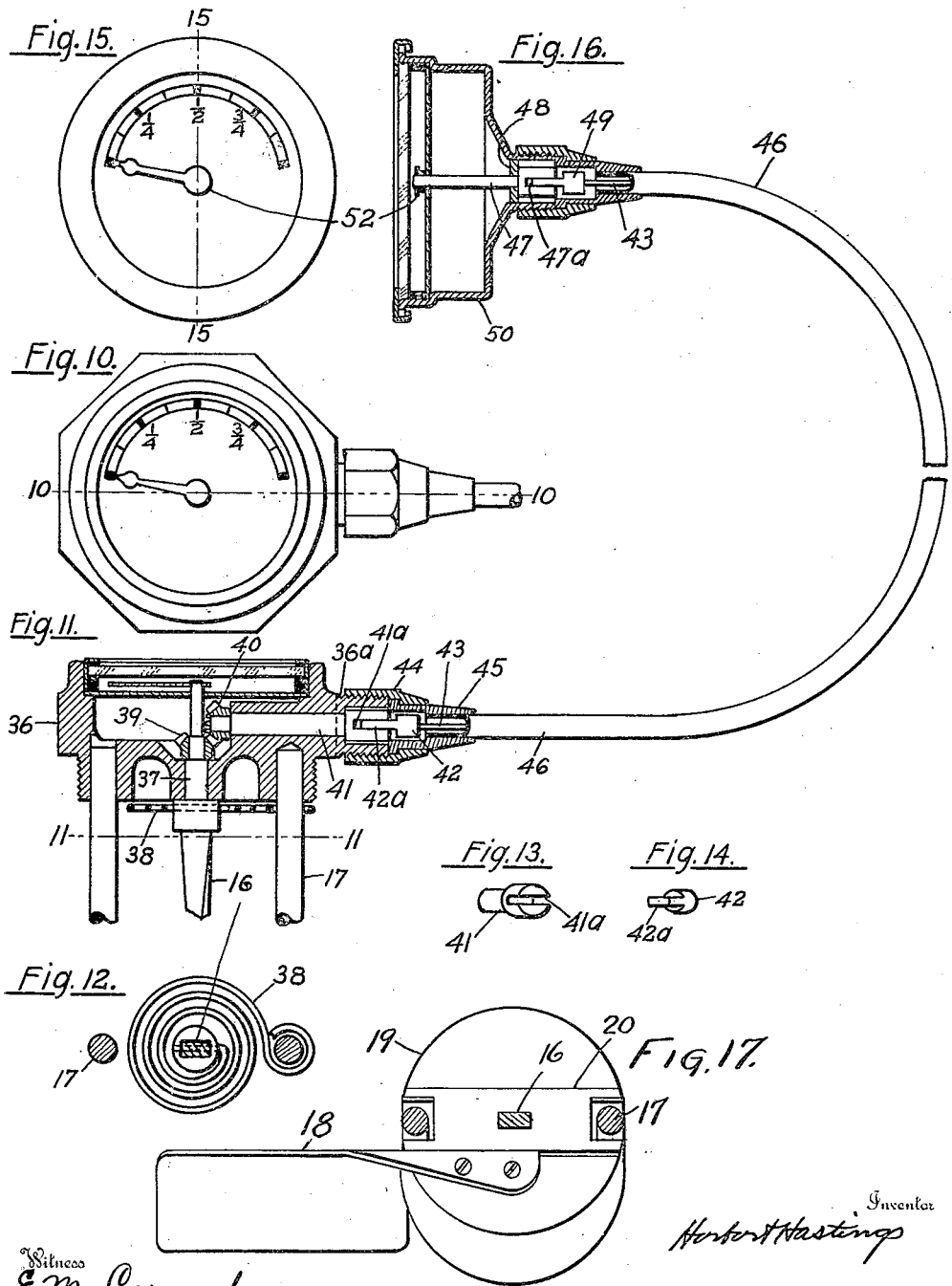

Patented Apr. 3, 1928.

1,664,558

UNITED STATES PATENT OFFICE.

HERBERT HASTINGS, OF BRIGHTON, NEW YORK.

LIQUID GAUGE.

Application filed September 10, 1921. Serial No. 499,695.

My invention relates to improvements in liquid gauges employing a float for use on fuel and oil reservoirs as used in connection with automotive motors and in any application where the fluid is in a state of more or less agitation as used; and the objects of my invention are first to provide means on the tank and also at a distance therefrom, for indicating the amount of liquid in the tank; second, to provide means for turning or operating the indicating mechanism otherwise than by buoyancy operating upon the float. Other objects of my invention will be pointed out in the following specification.

I attain these objects by the mechanism, parts and combinations illustrated in the drawings, in which—

Fig. 1 is a plan view, partly broken away, of the head of a gauge as may be provided for the tank.

Fig. 2 is a partial sectional view of the gauge taken on the line 1—1 of Fig. 1.

Fig. 3 is a plan view looking down upon Fig. 2 but with the pointer, dial and dial housing parts and cable connections removed.

Fig. 4 is a plan view of the impeller vane attached to the spiral Fig. 2.

Fig. 5 is a fragmentary, plan sectional view taken on the line 2—2 of Fig. 2 showing the float and co-operating parts.

Fig. 6 is a plan view of the remote indicator as provided for mounting at a distance from the tank.

Fig. 7 is a partial sectional view in elevation of the indicator assembly, taken on the line 6—6 of Fig. 6.

Fig. 8 is a plan view of the case or housing of the indicator shown in Fig. 7.

Fig. 9 is a perspective view of the movement assembly shown in Fig. 7.

Fig. 10 is a plan view of the head of a second form of gauge as provided for mounting on a tank, the same in appearance as Fig. 1 but of different construction.

Fig. 11 is a partial sectional view taken on the line 10—10 of Fig. 10 with the lower portion of the assembly broken away.

Fig. 12 is a partial sectional view including the form of spring shown in Fig. 11, taken on the line 11—11 of Fig. 11.

Fig. 13 is a perspective view of the slotted shaft 10 shown in Fig. 11.

Fig. 14 is a perspective view of the flexible shaft terminal 11 shown in Fig. 11.

Fig. 15 is a plan view of a second form of remote indicator.

Fig. 16 is a partial sectional view of the indicator taken on the line 15—15 of Fig. 15.

Fig. 17, is a perspective view of a float provided with an impeller vane.

Similar reference numbers refer to similar parts throughout the different views.

In Figs. 1, 2, 3, 4 and 5, 1 is a gauge head provided with threads $1^a$ for attaching to a tank, and the upper portion is provided with a recess or chamber $1^b$ adapted to receive the dial plate 2 which serves the double purpose of carrying the graduations $2^a$ and of holding the slide 6 in its seat, and dial housing members consisting of a glass 3, a spacing ring 4 and a retaining ring 5 with a thin sealing gasket between the ring and glass. Below the dial chamber the head is provided with a transverse slot $1^c$ adapted to receive a slide 6. Near one end this slide carries a roll 7 which is adapted to bear against a cam 8 secured to the stem 9, the other end of said slide is adapted to engage the sliding pin 10 so that said pin and slide move as one, the other end of this pin is provided, as at $10^a$, with means for engaging the enlarged end of a flexible wire or cable 11 which operates under tension. The head is further provided with a threaded hub $1^e$ and receives a nut 12 which holds a sleeve 13 against the end of the hub with its axis in line with the axis of pin 10, and in the outer end of this sleeve is secured a tube or flexible casing 14, which encloses the cable, said casing and cable operating to transmit the motion of said slide and pin 10 to the sliding yoke of the remote indicator described below.

The stem 9 above referred to, carries at its upper end a pointer 15 and at its lower end is adapted to engage a spiral shaft 16 so that said stem and spiral shall rotate together. The lower end of this spiral at $16^a$, is pivoted in a hole $17^a$ provided in the U shaped guide rod 17 the upper ends of which rod are secured in the head as shown. Near the lower end of the spiral an impeller vane 18 is rigidly attached. A float 19 provided with a plate 20 surrounds the spiral and operates between said vane and head, the float plate engaging the spiral and guides so that the axial position of the float determines the angular position of the spiral and the parts in train therewith as will be understood from the drawings and further described below.

Referring to Figs. 6, 7, 8 and 9 showing the remote indicator, 21 is a case provided with a seat 21ª for a dial 22 which is provided with graduations 22ª which dial is held in position by the glass 23, spacing ring 24 and retaining ring 25 which is provided at its bottom with an inturned flange 25ª and this flange is notched at 25ᵇ and these notches are adapted to slip over the ears 21ᵇ on the case 21 after which a slight turning of the ring locks it to the case. The case is further provided with a second seat 21ᶜ to which the movement plate 26 is secured. This plate is provided with a lower bearing 26ª and an upper bearing 26ᵇ and in and between these bearings is pivoted a spiral indicator stem 27, at the upper end of which is mounted a pointer 28. A sliding yoke 29 surrounds and engages this spiral so that axial motion of the yoke will cause rotation of the spiral, and this yoke is further guided in the ring 51 secured in the case 21 and is provided with a projection 29ª underneath which a spring 30 is adapted to engage and to exert a lifting force to the yoke, the lower end of the yoke is provided with means, as at 29ᵇ, for engaging the end of the cable 11, the other end being connected to the sliding pin 10 of the gauge unit as above described. The lower portion of the case 21 is threaded at 21ᵈ and over this thread the elongated nut 31 is screwed tight to the case and the other end of this nut is adapted to receive the threaded sleeve 32 and the check-nut 33 serves to hold these two parts in their adjusted position. A collar 34 is carried within this sleeve and is held against longitudinal motion therein between the ring 35 and the shoulder at the end of the sleeve but free to permit turning the sleeve, and within this collar is secured one end of the tube 14 the other end of which is connected to the gauge unit as above described. The purpose of this threaded sleeve is to provide means by which the sliding yoke 29 may be adjusted longitudinally so as to bring the pointer 23 of the indicator into agreement with the pointer 15 of the gauge relative to their respective dial scales.

In Figs. 10, 11, 12, 13, 14 and 15 I show means for transmitting motion from the indicator stem of the gauge unit to the indicator stem of the remote indicator, in which the connecting train transmits by torsion instead of by tension as in the above description. A head 36 is provided with a dial chamber, dial, and dial housing members identical with these parts described in the above gauge member. The pointer stem 37 is connected to the spiral 16 and is actuated thereby as already described with reference to Fig. 2 and engaging this stem is a spring 38 adapted to exert sufficient turning force upon the stem to overcome the resistance friction, etc., in the train of mechanism driven by said stem so that the float and impeller vane above described may be relieved of as much work as possible. The pointer stem carries a pointer at its upper end the same as in Fig. 2 and intermediately carries a miter gear 39 which engages a second miter gear 40 which is secured to and drives the shaft 41, the other end of this shaft is slotted as at 41ª and this slot is adapted to engage the tongue 42ª of the coupling 42 in a manner as to rotate the coupling and the flexible shaft 43 to which it is attached. A threaded boss 36ª is provided on the head 36 which receives a shouldered nut 44 and this engages and holds the sleeve 45 against the end of the hub and in axial alignment therewith, and in this sleeve is secured one end of the tube 46 as also described above relative to Fig. 2. The remote indicator in this assembly is of the same general construction and description as applies to Figs. 6, 7 and 8 as far as the dial and dial housing parts are concerned, the pointer stem 47 bears near one end in the dial and carries a pointer 52 and is further supported in the apertured disc 48 secured in the case and the outer end is slotted at 47ª for engagement with the coupling 49 attached to the flexible shaft 43, in the same manner and for the same purpose as described on Fig. 11, also the tube 46 is connected to the case 50 in the same manner as described on Fig. 11 all as will be readily understood from the drawings.

The functioning of the above described assemblies is as follows:

The parts of the gauge extending below the head Fig. 2 are inside the liquid reservoir when installed for operation, the float normally rides on the surface of the liquid and as it moves along the spiral, exerts a turning force thereto proportional to its buoyancy and weight and in the case of a simple single unit gauge where it is only necessary to actuate the pointer 15 (as in my Patents 1,272,436 and 1,379,404) this turning force is sufficient but in the present case, with the remote indicator in train it is not sufficient to insure positive and constant response to a change of liquid level and therefore in order to have an ample turning force operating on this train I provide an impeller which is always surrounded with the liquid in the reservoir and the surge of this liquid caused by the motion of the vehicle carrying it, is utilized through the impeller to apply a strong turning force to the spiral and connected parts while the amount that the spiral can turn is limited by the position of the float and since the surge is constantly reversing direction the spiral and float are constantly turned back and forth, and there being perceptible clearance provided between the guide rods 17 and float plate 20, see Fig. 5, there will be momentary periods at each reversal when the float is free to rise or fall unimpeded and by this means constantly retain its correct position on the surface of the liquid while the work of rotating the parts is done by the impeller. This impeller or equivalent could be made a part of the float or float plate or attached thereto as shown in Fig. 17 and I include such construction in my invention although I prefer the form shown in Figure 2.

When the liquid tank is being filled the float will rise in the tank keeping pace with the level of the liquid in the tank and this allows the spring 30 to move the pointer on the dashboard gauge to accurately indicate the level of the liquid in the tank. That is, the pointer of the gauge will swing upward on the scale as the float, riding on the level of the liquid, rises in the tank. But the movement of the pointer is due in most cases to the pulling of the spring and is seldom due to any positive action of the float. The spring is made just about strong enough to secure this result. The float merely rises fast enough to allow the pulling of the spring to turn the pointer and indicate the position of the float. The impeller moves with the indicator as the float rises and permits it to turn as the spring pulls.

If the car is left motionless and the tank is drained, the float may not drop by gravity but may remain up and cause a false indication. This is due to the pulling effect of the spring 30 and the inertia of the impeller and other parts and friction. The pull of the spring opposes the fall of the float. It is not necessary that the float should be heavy enough that it should drop by gravity and pull with it the spring and the train of mechanism. The action of the impeller makes this unnecessary when the car is in motion. When the car is at rest the float is held up by the spring 30 which pulls on the cable 11 and this together with the friction neutralizes the gravity of the float. When the car is in motion and the liquid is agitated, the impeller is swayed back and forth thereby, as the impeller sways the float turns with it and the movement of the two is limited by the clearance between the rods 17 and the plate 20 shown in Figure 20. The swaying of the impeller 18 neutralizes or overcomes the pulling effect of the spring and releases the float usually at frequent intervals and gives it an opportunity to drop step by step until it comes into balance with the level of the liquid and this in turn causes the pointer to move down the scale step by step until it correctly indicates the quantity of the liquid in the tank as it diminishes.

The impeller and pointer usually swing with a series of short back and forth movements turning the float with it through the small clearance shown in Figure 5. When the impeller is in the middle of a swing the float is released and will drop as far as the spiral in the rod 16 will permit. This drop is usually a fraction of an inch. When the float is in its new position it changes the starting and stopping point of the swing of the impeller by a small amount. The float thus drops with a series of short steps and each drop is accompanied by a short forward and backward swing of the impeller and indicator, the indicator each time moving further down the scale, the impeller changing position to correspond. The swinging of the impeller 18 is caused principally by the surging of the liquid in the tank which in turn is caused by the movement of the car, but this will not lift the float. It does permit the float to drop when the level of the liquid is below it or to rise when the level of the liquid is above it. But when the float has adjusted itself to the normal or mean level of the liquid in the tank the impeller is locked against swinging except as it is permitted by the clearance between the rods 17 and the openings in the plate 20 and the clearance between the spiral rod 16 and the plate 20 as shown in Figures 5 and 2. This is sufficient to let the indicator, shaft and impeller swing back and forth two or three degrees. The float is held against the rods 17 by the impeller and its shaft and is thereby held back by friction against up and down motion due to surface waves. When the impeller moves, this up and down motion is permitted by the clearance between the rods 17 and the openings in the plate 20, and the clearance between the spiral rod 16 and the plate 20.

It will also be understood that if the float and impeller move exactly together due to the surging of the liquid the float may rise and fall in obedience to the wave, but this equality of action rarely happens as the impeller swings faster or slower than the float moves up or down due to surface waves and the impeller therefore locks the float against movement.

The lift of spring 30, Fig. 7, exerted through the train keeps the roll 7 constantly against the cam 8 so that as the cam rotates the slide 6 and yoke 29 move proportionately, turning the spiral 27 to give the indicator pointer movement proportionate to the gauge pointer movement. The threaded sleeve 32 provides adjustment for bringing the indicator pointer into agreement with the gauge pointer and makes assembly in place easier. In the second form involving my present invention Figs. 11 to 16 the transmission is through torsion and its operation will be readily understood from the foregoing. When the tank is being filled there is usually not as much surge as when running and for this reason I have arranged so that the force exerted by the springs, 30 in the first case and 38 in the last, tend to operate the train in the direction they should move as the float rises.

I am aware that single unit liquid gauges have been made using a float, spiral and pointer mounted on the tank and that remote indicators (sometimes called dash indicators) have been made in connection with a tank unit but without means of indicating incorporated in the tank unit, I am not aware of a combination of the two or two separate units readily adaptable to combination, nor of impelling means other than the float or equivalent nor of other features of construction herein shown and described.

I therefore claim—

1. In a liquid gauge, the combination of a float with means for guiding it, a rotatable member adapted to have its rotation controlled by the float and means other than the float adapted to be driven by the impact or movement of the liquid that supports the float for moving the rotatable member.

2. In a liquid gauge, the combination of a rotatable member, a float and means for controlling the rotation of the member from the float, means other than the float for utilizing the motion of the liquid in which the gauge operates for turning said member and means for mounting said member and float within a liquid receptacle.

3. In a liquid gauge, a float, means for guiding it, an actuable member adapted to have its actuation controlled by the float and a non-floating means operated upon by the liquid surrounding the gauge said non-floating means actuating said actuating member.

4. In a liquid gauge, a float, means for guiding it within a receptacle, an actuable member adapted to have its actuation controlled by the float, indicating means rigid with said member, said actuable member being provided with a vane adapted to utilize the motion of the liquid in which the gauge operates for actuating said member.

5. In a liquid gauge, a float, means for guiding it, an actuable member adapted to have its actuation controlled by the float and an impeller attached to said member adapted to receive impulses from the motion of the liquid in which the gauge operates for actuating said member.

6. In a liquid gauge, the combination of a float with means for guiding it, a member having its movement controlled by the float, means other than the float adapted to be driven by the impact or movement of the liquid that supports the float, for moving said member.

7. The combination of an indicator and a float for operating it, means for guiding said float, a second indicator adapted for installation remote therefrom, a mechanical train connecting said indicators, and adapted to produce simultaneous functioning of the two indicators, means unaffected by the action of the liquid in the receptacle for tending to move said indicators and train in one direction and means co-acting with the float and adapted to utilize the surge of said liquid for operating said indicators and train in both directions.

8. In a liquid level indicator, the combination of an indicator adapted for installation remote from the liquid to be indicated, a second indicator, a float operating means connecting said float and said second indicator, means connecting said second indicator and remote indicator and operating the latter in unison with the former, means other than the float connected to the operating means for operating said indicators through impact of the liquid and under the control of the float.

9. In a liquid gauge, a rotatable member provided with an indicator, a float adapted to determine the amount of rotation of the member, non-floating means adapted to be actuated by the motion of the liquid for oscillating the member so that the float will be freed to rise or fall and means for supporting these parts within a liquid receptacle.

10. In a liquid gauge, a rotatable member, a float for controlling the rotation of said member, means independent of the float adapted to utilize the horizontal surge of the liquid in which it operates for rotating said member under the control of the float and means for supporting said parts in a liquid receptacle.

11. In a liquid gauge, the combination of a float, a rotatable member provided with an indicator, said member being controlled in its rotation by said float, a transmission train connected with said rotatable member, a device provided with an indicator and located remote from said member, said train being connected to said device, all being adapted to produce motion of the remote device and its indicator in unison with the motion of the first named indicator and non-floating means cooperating with the float and adapted to be driven by the impact or movement of the liquid that supports the float for rotating said rotatable member under the control of the float.

12. In a liquid gauge, a rotatable member, a float, said rotatable member having the shape of a spiral shaft with which the float engages whereby it is rotated on the movement of said float, guides for said float, non-floating means independent of the float adapted to utilize the horizontal surge of the liquid in which it operates for rotating said member under the control of the float and means for supporting said parts in a liquid receptacle.

13. An indicator adapted for mounting in a tank, a second indicator adapted to be located at a distance therefrom, means connecting said indicators whereby said second named indicator is controlled by said first indicator, a float for controlling said indicators, means independant of both the float and the liquid in which it operates for assisting the movement of the indicators in one direction and means independent of the float, but operated upon by the surging of the liquid for moving said parts in both directions under the control of the float.

14. In a liquid level indicator, a casing, a dial in said casing, a rotatable spiral shaft provided with a pointer cooperating with said dial, a slide and means adapted to cause said slide to oscillate with said spiral shaft, a transmission member attached at one end to said slide, a second gauge having a reciprocating member to which the other end of the transmission member is attached, a float for controlling the rotation of said shaft, and non-floating means operated by the surge of the liquid and independent of the float for actuating said shaft under the control of the float.

15. In a liquid gauge, the combination of a stationary dial and an indicator rotating over said dial, a float and means whereby said float controls the rotation of said indicator, an impeller mounted on said means for rotating said indicator and adapted to vibrate said float to permit the indicator to move under the control of the float.

16. In a liquid gauge, the combination of a stationary dial and a movable indicator and a spiral shaft connected therewith, a float rising and falling with the level of the liquid for controlling said spiral shaft and indicator, a guide for said float, an impeller moving back and forth sideways with the surging of the liquid and connected to and adapted to move said spiral shaft and said indicator subject to the control of the float.

17. In a liquid gauge, the combination of a tank, a dial on the tank and a movable indicator therefor, a remote dial and indicator, means connecting the indicator on the tank with said remote indicator, a float rising and falling with the level of a liquid and means associated therewith for controlling the position of the indicator, an impeller moving back and forth sideways with the surging of the liquid for moving said indicators through said last named means subject to the control of the float, the movement and position of said impeller being functionally independent of the level of the liquid.

18. In a liquid gauge, the combination of an indicator, an operating shaft therefor, a float adapted to tend to operate said indicator through said operating shaft to indicate the level of a liquid on which said float floats, a non-floating member coacting with said float on said operating shaft for operating said indicator, said non-floating member being submerged in the liquid on which said float floats, said non-floating member being adapted to check the rise and fall of said float when the level of the liquid temporarily rises and falls due to the surging of the liquid past said float by keeping said operating shaft stationary or allow but a limited movement thereof.

19. In a liquid gauge, the combination of a spiral indicator shaft, a float member tending to turn said shaft on the rise or fall of the mean level of the liquid, guides for said float, a non-floating member connected to said shaft and moved in a horizontal plane by the motion of the liquid to assist the rotation of said shaft by said floating member on the slow rise or fall of the mean level of the liquid but retard the movement of said shaft by said floating member on a quick and temporary rise and fall of the level of the liquid due to the agitation of the liquid in the tank.

20. In a liquid gauge, the combination of a movable indicator, an impeller and means connecting said impeller with said indicator, a float operating on said means and adapted to govern the motion of said indicator and guides for said float.

21. In a self-contained gauge, having a reciprocating member, a cam engaging said reciprocating member, a float and an impeller, and means connecting said float and said impeller with said cam, said float being adapted to feebly actuate said cam through said means, on the rise or fall of the liquid, said impeller being adapted to strongly actuate said cam through said means on the surge of the liquid and under the control of said float.

HERBERT HASTINGS.